May 19, 1925.

L. G. COPEMAN 1,538,467

METHOD OF MOLDING THE SHELLS OF REFRIGERATORS

Filed June 25, 1923 7 Sheets-Sheet 1

Inventor
Lloyd G. Copeman

By Stuart C. Barnes
Attorney

May 19, 1925.  
L. G. COPEMAN  
1,538,467  
METHOD OF MOLDING THE SHELLS OF REFRIGERATORS  
Filed June 25, 1923  7 Sheets-Sheet 2

Inventor  
Lloyd G. Copeman  
By Stuart E. Barnes  
Attorney

May 19, 1925. 1,538,467
L. G. COPEMAN
METHOD OF MOLDING THE SHELLS OF REFRIGERATORS
Filed June 25, 1923 7 Sheets-Sheet 3

Inventor
Lloyd G. Copeman
By Stuart C. Barnes
Attorney

May 19, 1925.  1,538,467
L. G. COPEMAN
METHOD OF MOLDING THE SHELLS OF REFRIGERATORS
Filed June 25, 1923  7 Sheets-Sheet 4
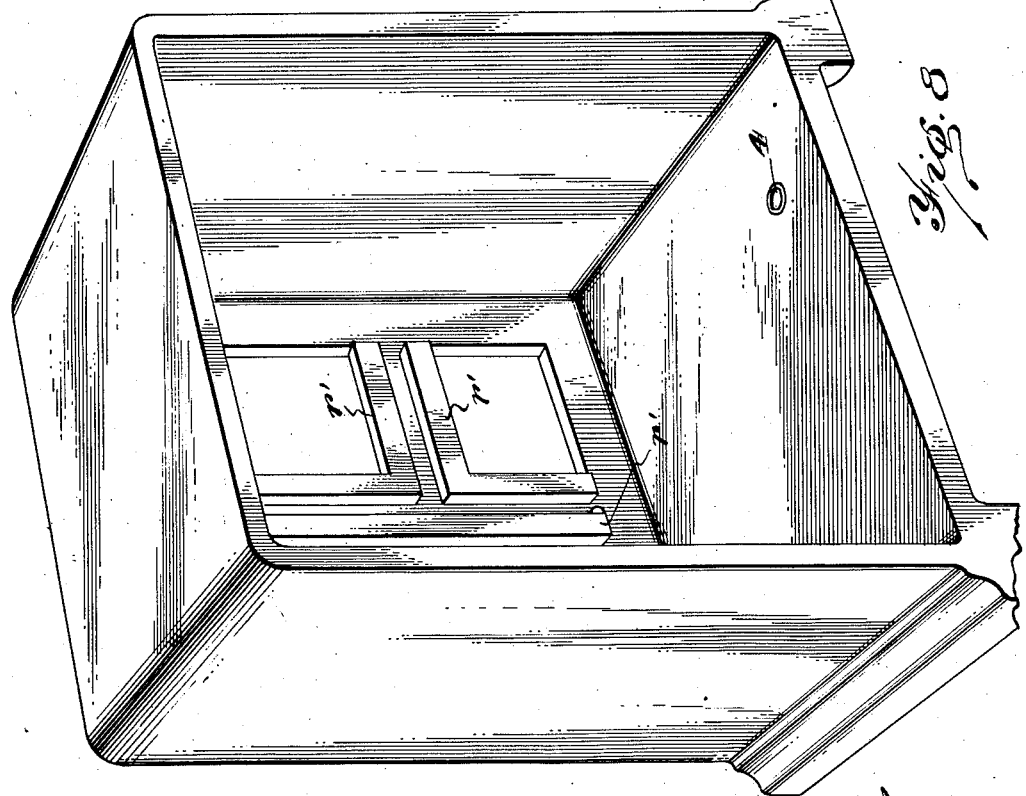
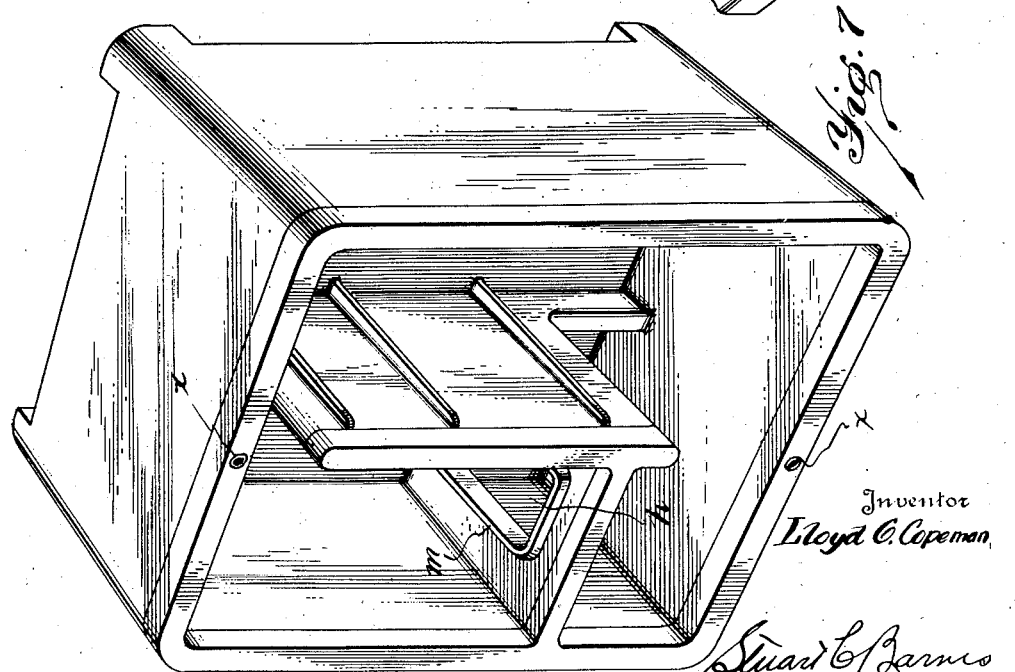
Inventor
Lloyd G. Copeman
By
Stuart C. Barnes
Attorney

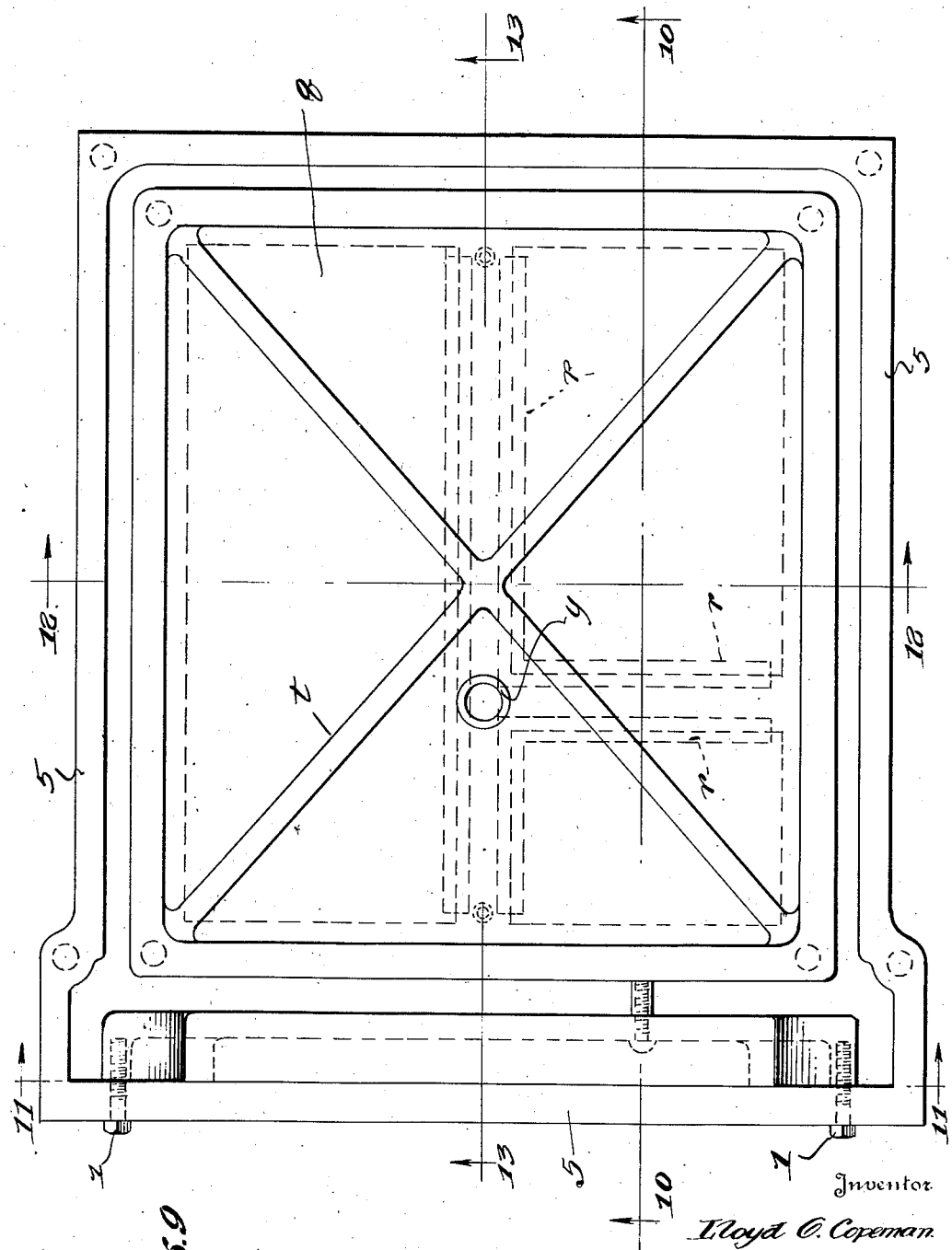

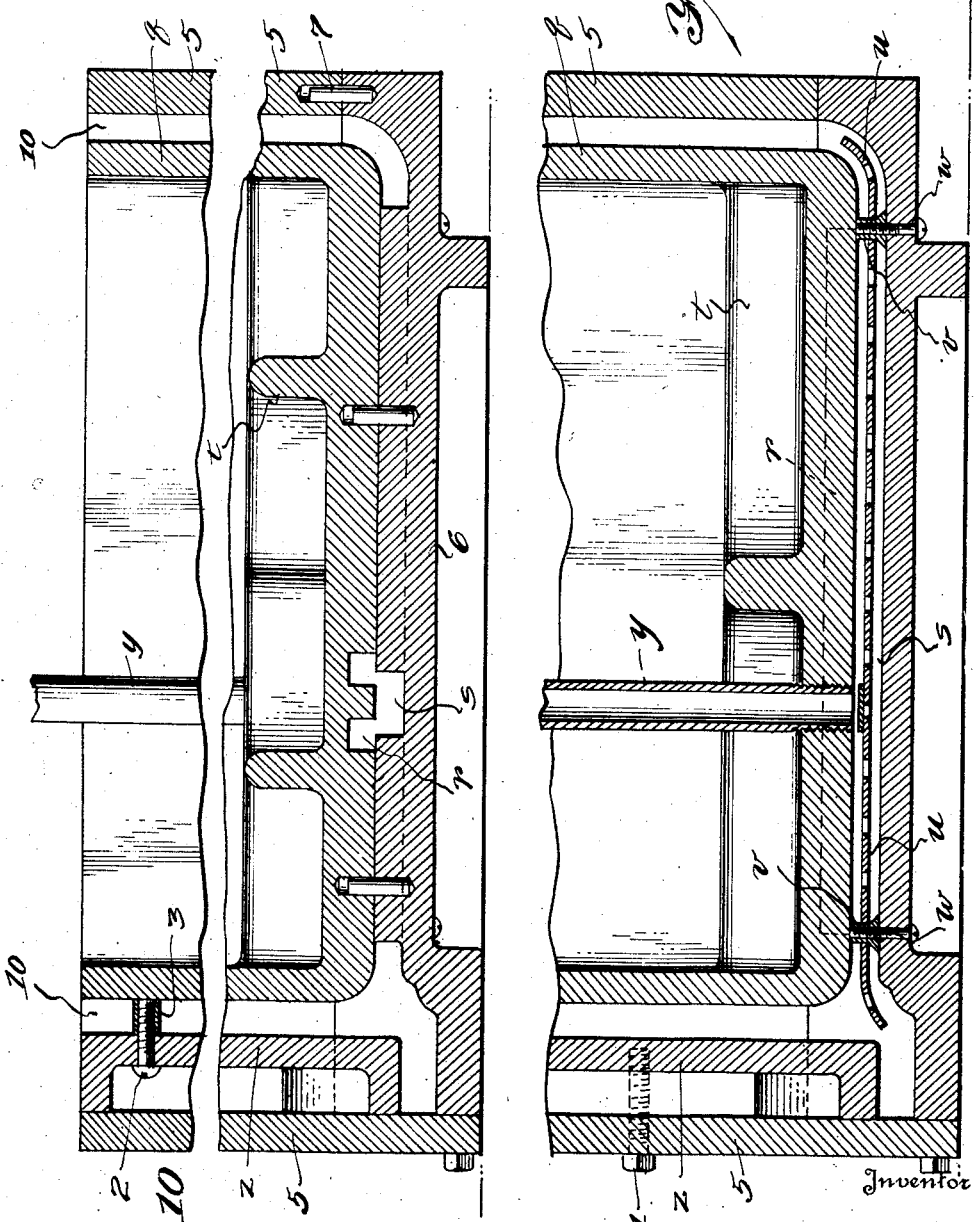

May 19, 1925.  
L. G. COPEMAN  
1,538,467  
METHOD OF MOLDING THE SHELLS OF REFRIGERATORS  
Filed June 25, 1923  
7 Sheets-Sheet 7

Inventor  
Lloyd G. Copeman  
By Stuart C. Barnes  
Attorney

Patented May 19, 1925.

1,538,467

UNITED STATES PATENT OFFICE.

LLOYD G. COPEMAN, OF FLINT, MICHIGAN.

METHOD OF MOLDING THE SHELLS OF REFRIGERATORS.

Application filed June 25, 1923. Serial No. 647,599.

*To all whom it may concern:*

Be it known that LLOYD G. COPEMAN, citizen of the United States, residing at 1715 Detroit St., Flint, in the county of Genesee and State of Michigan, has invented certain new and useful Improvements in Methods of Molding the Shells of Refrigerators, of which the following is a specification.

This invention relates to dies, it also includes the discovery of a method of manufacturing a substantially complete stone refrigerator.

In my co-pending application No. 647,603, I have described and claimed this stone refrigerator which comprises an outer molded stone shell with an inner molded stone shell telescoping in the outer shell and floated therein in spaced relation. Suitable heat insulating material is packed in between the space in the inner and the outer shells. The building of a stone refrigerator of the character mentioned involves rather difficult problems in stone molding and also requires special dies and cores of new, unique, and ingenious construction, to permit the shells to be drawn from the molds. This will be more fully explained hereinafter.

Figure 1:
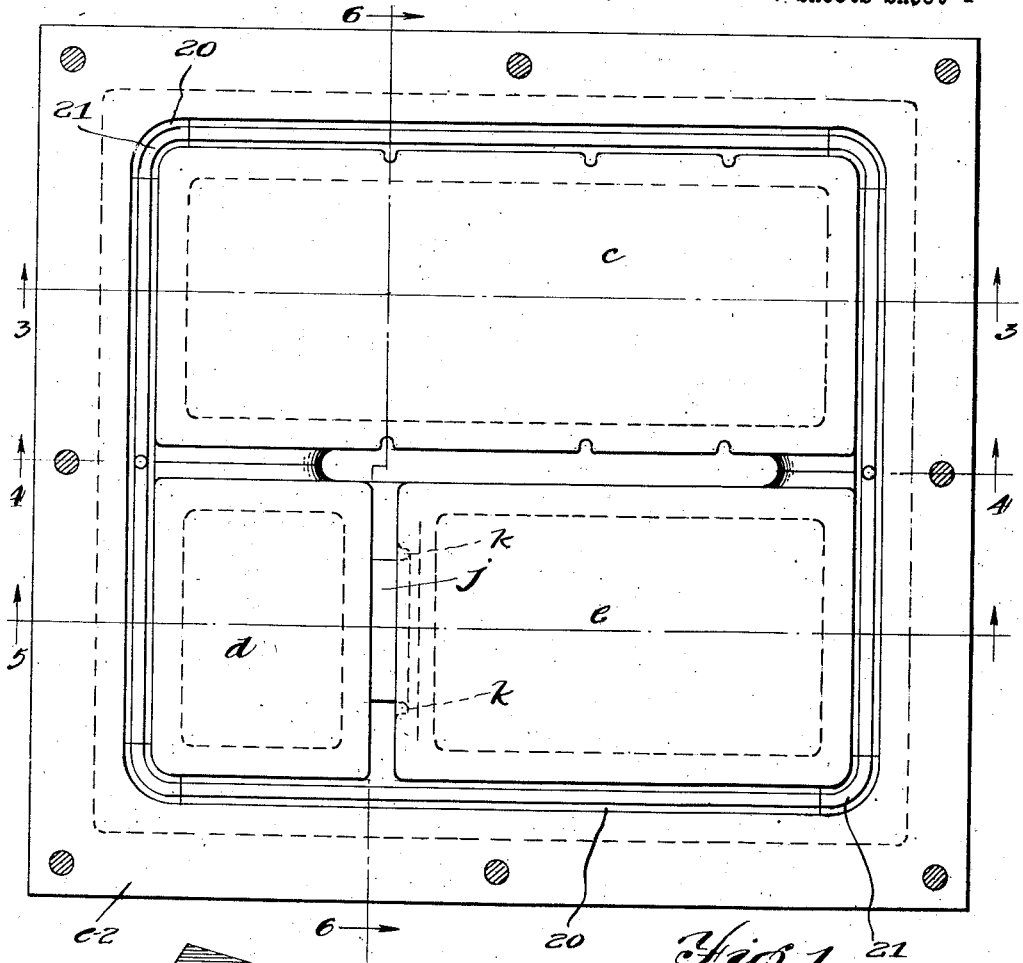
Fig. 1 is a plan view of the die for molding the inner shell. This die is provided with three box cores.

Figs. 3 to 6 inclusive are sections on the lines similarly enumerated in Fig. 1.

Fig. 7 is a perspective of the inner cast shell, showing the insulating material secured thereon.

Fig. 8 is a perspective of the outer case shell.

Fig. 9 is a plan view of the dies for casting the outer shell.

Figs. 10, 11, 12 and 13 are sections on the lines similarly enumerated in Fig. 9.

Figure 14:
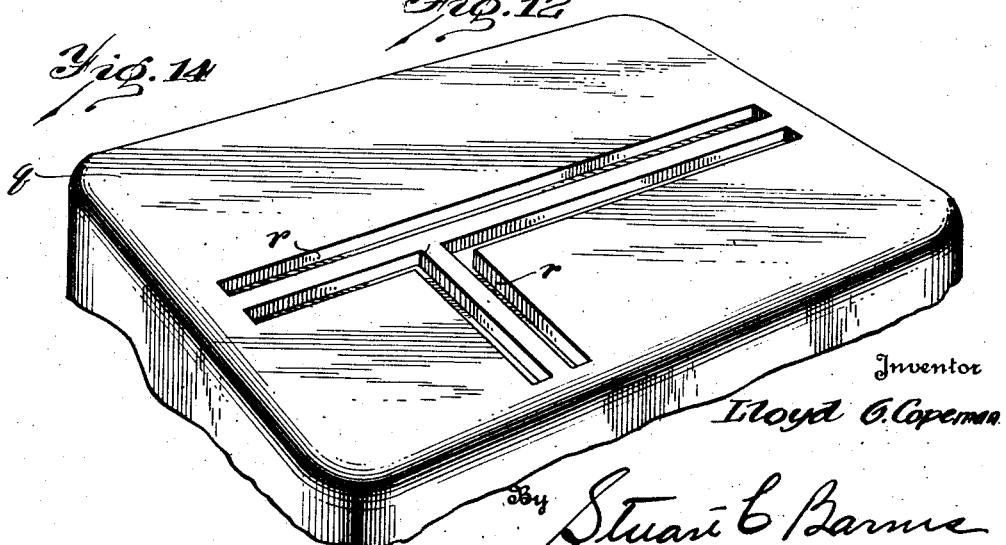

Fig. 14 is a fragmentary perspective of the core used in casting the outer shell.

Figure 3:
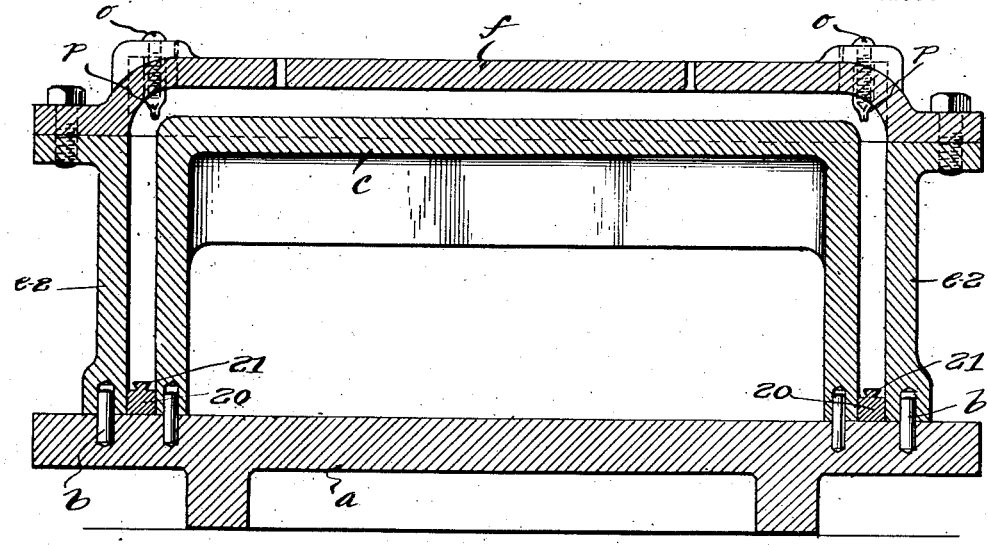
Figure 4:
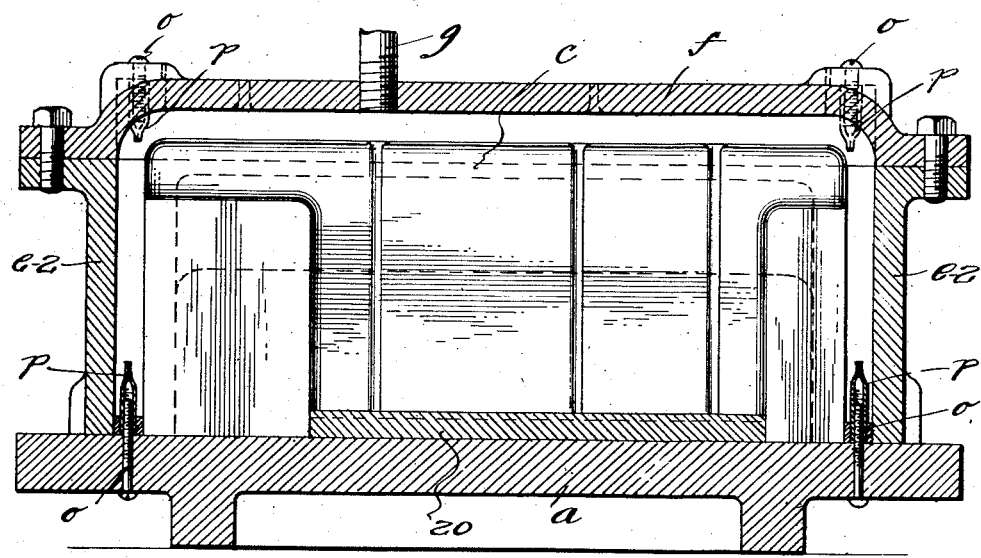

Referring to Figs. 7 and 8, the cast stone inner shell and outer shell appear. The inner shell is made by employing a set of dies and cores such as shown in Figs. 1, 3 and 4. A base $a$ is provided with dowel pins $b$. Three box cores $c$, $d$, and $e$ form the large food chamber, the lower food chamber, and the ice chamber, respectively. These cores are located upon the base by the dowel pin and dowel hole inter-locks. The outer die $e^2$ is also doweled onto the base while an upper die or cope $f$ can be bolted to the flange of the outer die or drag. The pour is introduced through the filler tube $g$ and the dies are suitably vented at the top. One of the difficulties in molding this internal shell is separating the solid core which forms a passage between the lower food chamber and the upper ice chamber. This passage is designated $h$. All the other parts of the casting can be made of sufficient draft so that the parts may be easily pulled out. However, the core that forms the opening into the horizontal partition is precluded from coming out by a simple lifting operation, hence I so form the parts that the core and its base is left in the work when the major portion of the dies and cores are drawn from the work.

Figure 2:
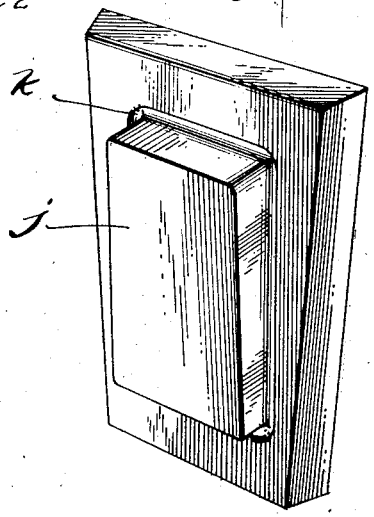
Fig. 2 is a perspective of a dove-tailed wedge-shaped part of the core and used to cast the opening between the lower food chamber and the upper ice chamber.
Figure 5:
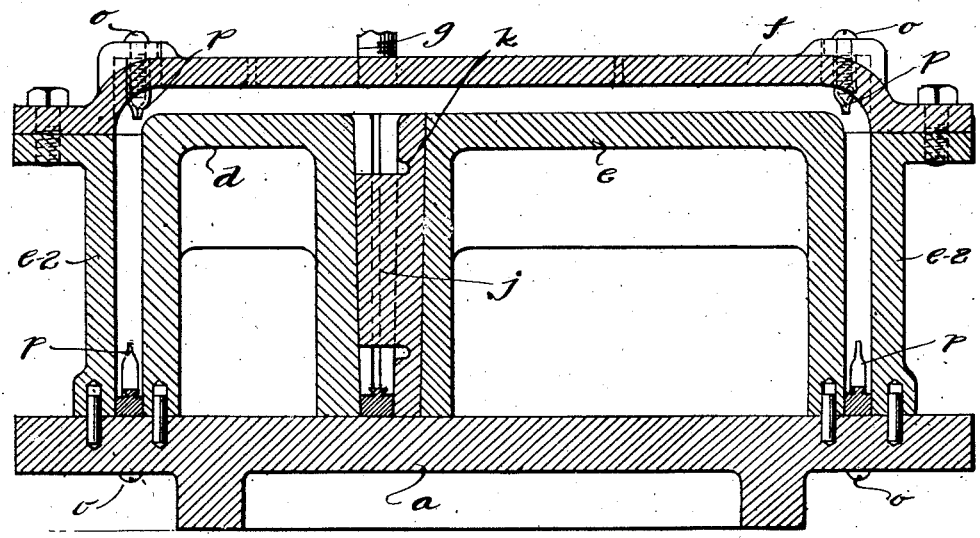

It will be noticed that this core $j$, detailed in Fig. 2, has a base which is wedge-shaped. This base has the sides also dove-tailed (see Fig. 1, also Fig. 6). The bottom of the ice chamber core $e$ has both a tapered and dovetailed socket into which this core $j$ may be driven in sliding relation as shown in Fig. 5. When it is driven completely in it forms an integral part of the box core $e$ and is adapted to butt directly up against the box core $d$ which forms the lower food chamber. The base of this core is grooved around the core as at $k$ for the purpose of forming the bead $m$ about the opening between the ice chamber and the lower food chamber.

The dies and core parts are removed from the work by first turning the assembled mold parts over positioning the cope $f$ on the bottom. The base $a$ may then be removed and the box cores $c$ and $d$ lifted out. Next the box core $e$ is removed and due to the wedge shape of the base of the core $j$, the core $e$ can be lifted out leaving the core $j$ in the casting which is held therein by the core part which fits into the passage-way $h$. The outer die $e^2$ can be removed and also the core $j$ may be withdrawn from the partition at right angles to the direction taken by the core $e$ when it is removed from the casting.

Figure 6:
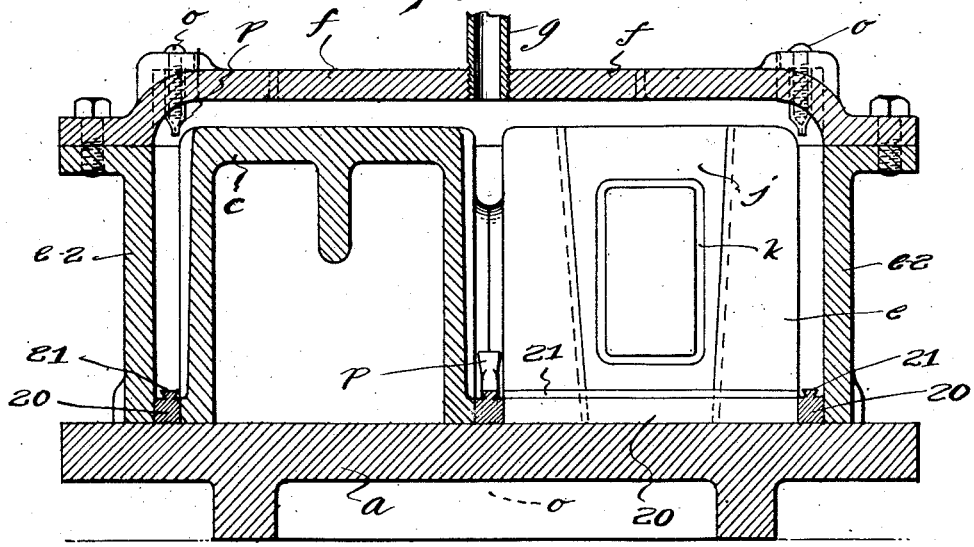
Figure 11:
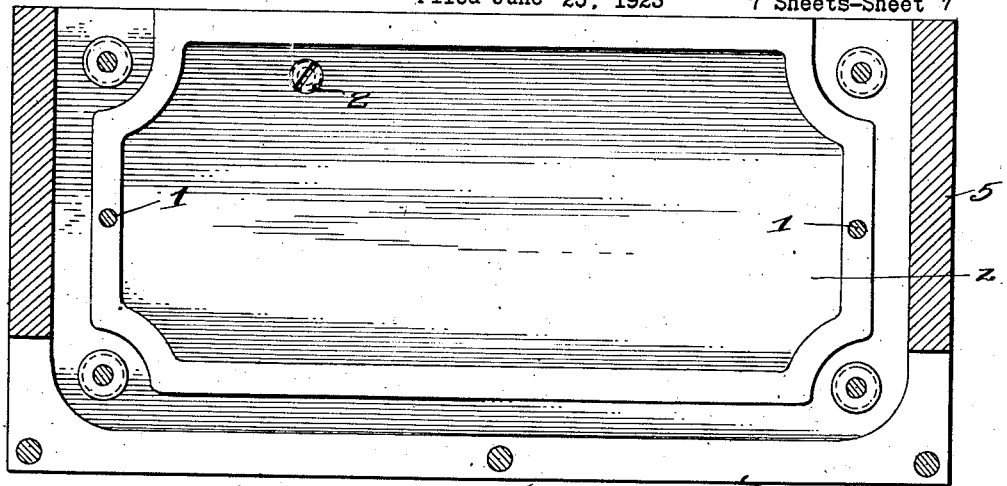
Figure 12:
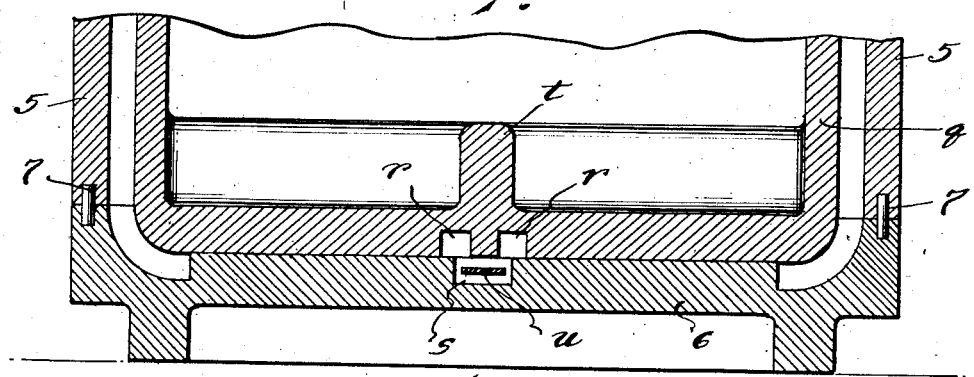

It will be noticed that bolts $o$ are provided which screw into the bushings $p$. These are metal bushings that are left in the casting and become a part of the final job to take any screws or bolts for the purpose of holding the inner shell in the outer shell. These bushings are flattened at the ends as shown in Fig. 6 for the purpose of preventing them turning and also for the purpose of preventing them from being longitudinally drawn from the casting.

In the bottom of the channels formed by the box cores and the outer die I have fitted a wood strip 20 formed with a dove-tail 21 running longitudinally thereof which forms a suitable insulating strip between the inner shell and outer shell when they are assembled.

In Fig. 13 the outer shell is cast by a set of dies and one core as appears in Figs. 9, 10, 11, 12 and 13. A core $q$ is provided with grooves $r$ in its face which complement the groove $s$ to form the mullion at the front of the refrigerator, that is, the door post between the door apertures. They also form the inwardly projecting ribs on the inside of the casting which are designated $r'$ in Fig. 8. This inner core is crossed or X-ribbed as designated at $t$ to strengthen the same.

Referring to Fig. 13 it will be seen that the reinforcing bar $u$ is held in properly spaced relation in the mullion groove of the mold by means of the counter-headed bushings $v$. These counter-headed bushings $v$ are held in the lower die by means of the screws $w$. When the bushings are removed as they are, they afford passage-ways for the bolts which pass through the outer shell and into the sockets $x$ (Fig. 7) for floating the inner shell in spaced relation with the outer shell as described more fully in my co-pending application. A filler tube $y$ leads down through the core for pouring. It is not necessary to pour the entire mold through this filler tube $y$. It is preferable, however, to pour some of the material through this tube so that the grooves $r$ and $s$ may be entirely filled with the casting material. Since the mold is open at the top, the material may be poured into the mold through the openings designated 10. This pouring is continued until it is noticed that the material begins to rise in the tube $y$ thereby indicating that the grooves $r$ and $s$ are entirely filled. At this time the tube $y$ may be plugged up and the pouring continued through the openings 10 until the entire mold is filled, at which time it may be laid aside so that the casting material will harden and set.

The legs of the outer shell are formed by the use of the side core $z$ which is held by the bolts 1 in the outer die or flask 5. A bolt 2 is carried by the side core $z$ which holds a bushing 3 within the mold for the purpose of providing the opening 4 (Fig. 8) in the bottom of the outer shell casting. In disassembling the mold the core $c$ is removed by lifting the same vertically from out of the casting. The next step is to remove the bolts 1 so as to free the side core $z$ from the outer die or flask 5. The outer die can then be unbolted from the base 6 and lifted off the casting leaving the side cover $z$ in the casting. The side core may now be removed laterally from the casting, i. e., at right angles to the line of draft taken by the other core parts when they are removed from the casting.

What I claim is:

1. The method of making a refrigerator which comprises the casting of an inner plural chambered shell by the pouring of a semi-fluid cementitious composition material into suitable molding apparatus and permitting the same to set, the casting of an outer shell with the same material and in the same way, and the fastening of the two shells together in spaced relation to complete the refrigerator enclosure.

2. The method of making a stonework refrigerator, which comprises the molding of an outer shell in suitable dies and a core by pouring a semi-fluid cementitious composition material and permitting the same to set, the casting in the same manner with a plurality of cores of a plural chambered inner shell, the telescoping of the two shells together, and the fastening of the inner shell to the outer shell so as to be telescopic therein.

3. The method of making a stonework refrigerator, which comprises the molding of an outer shell of stonework, the molding of an inner shell of stonework, the telescoping and fastening of the two shells together with their open ends inverted with respect to each other.

4. The method of making a stonework refrigerator, which comprises the molding of an outer shell of cementitious composition material with one or more door-ways, the molding of an inner chambered shell of cementitious composition material, the telescoping of the two shells together with their open ends inverted, and the fastening of said shells together in such relation.

In testimony whereof he has affixed his signature.

LLOYD G. COPEMAN.